INVENTOR.
John F. Mulloy

United States Patent Office 3,191,535
Patented June 29, 1965

3,191,535
SOLID CELLULAR METALLIC PROPELLANTS
John F. Mulloy, Midland, Mich., assignor to The Dow Chemical Company, Midland, Mich., a corporation of Delaware
Filed May 25, 1959, Ser. No. 815,739
10 Claims. (Cl. 102—98)

This invention relates to solid propellants and a method for their preparation.

To develop high speeds and high thrusts with rocket engines, high energy fuel is essential. The heat of oxidation of certain light metals, such as magnesium, aluminum, beryllium, silicon, lithium, and titanium is exceedingly high either in terms of heat content per unit weight of the metal or per unit weight of oxygen or both. Thus, they possess a great potential value in providing increased range and thrust when employed as fuels in propellants. Heretofore, it has been suggested to disperse finely ground metal in liquid fuels used in rocket or jet engines. However, due to the presence of the dispersed metal, a complicated mechanical metering device for feeding the fuel into the combustion chamber is required. Thus, the additional weight added to the rocket or jet by the complex metering device offsets to a considerable extent the advantage gained by using the metal in the liquid fuel.

It is, therefore, an object of this invention to provide a solid propellant containing a high energy oxidizable metal. A further object is to provide a convenient and simple method for the preparation of these metal-containing propellants.

The solid propellant, according to the invention, consists essentially of a cellular fuel element having uniform interconnecting spherical voids of a metal selected from the group consisting of aluminum, magnesium, beryllium, alloys and mixtures thereof and alloys thereof with silicon, lithium, and titanium, and an oxidant filling said voids.

Figure 1:
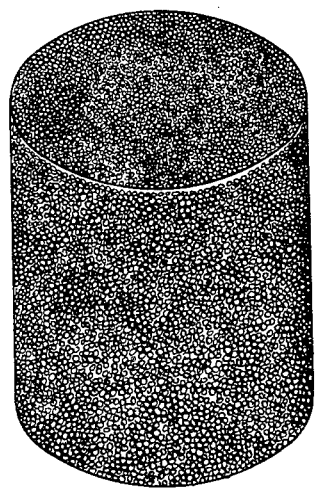

A solid propellant of the invention is diagrammatically illustrated in FIG. 1. As shown in FIG. 1, the metal matrix making up the cellular fuel element is cylindrical having relatively uniform size interconnecting spherical voids throughout the element filled with an oxidant.

The term "voids" as used herein in reference to the cellular element means the openings or cells in the element.

Figure 2:
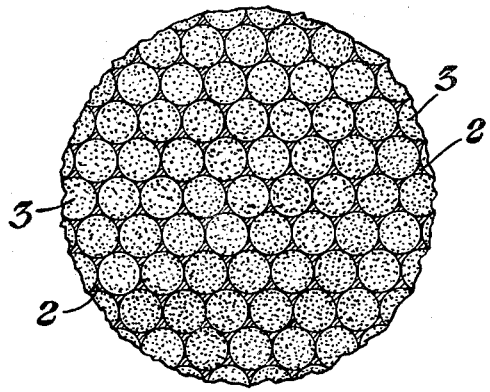

FIG. 2 is an enlarged fragmentary view of the propellant of FIG. 1 showing in more detail the metal matrix 2 and the oxidant filled voids 3 of the cellular fuel element.

The solid propellant may be formed in any size or shape. It may be cylindrical, rectangular, annular, or be made to fit a particular engine in a form best suited for the most efficient burning. It is not necessary to use only an oxidant in the voids. A mixture of a monopropellant and an oxidant also may be used. The ratio of voids to metal in the propellant is controlled to give the desired ratio of oxidant to metal such that substantially complete oxidation of the metal is obtained. When a monopropellant is intermixed with an oxidant, the element used has less metal and more or larger openings or voids. The cellular fuel element is of sufficient strength to ensure the structural integrity of the device in which it is used and greatly reduces the structural weight. It also eliminates the problem of cracks, fissures, and voids which are obtained with the elastomeric bound fuels, causing unsteady burning or detonation of the rocket.

In the preparation of the solid propellant, the cellular metal element is obtained by molding or casting. A mold of the desired shape is packed with spherical granules of predetermined size of a metal insoluble constituent which has a melting point above the molten metal. The mold is filled with the granules so that the granules are in contact with each other. The mold, thus packed, is preheated and the molten metal poured into it. The metal flows around the granules of the insoluble constituent and into the interstitial spaces between the granules forming a cellular structure of the metal surrounding the granules. After cooling, the metal insoluble constituent is dissolved from the metal by use of a solvent relatively inert to the metal. A porous metal element is thus obtained having the shape of the mold and voids of the size of the granules with which the mold was packed.

Cellular fuel elements of aluminum, magnesium, beryllium, alloys and mixtures of these metals and also alloys and mixtures of these metals with lithium, silicon, and titanium may be thus made. The particular metal insoluble constituent employed to pack the mold will vary with the metal used. With metals, such as magnesium, aluminum, or alloys thereof which have a low melting point, numerous salts meet the requirements of being insoluble in the molten metal and having a melting point above the melting point of the metal. Illustrative examples of these salts are sodium chloride, calcium chloride, barium chloride, potassium chloride, and magnesium chloride. These salts may be obtained in a spherical form by prilling. For higher melting point metals, such as beryllium, beryllium oxide may be used as a packing. After beryllium is cast, the beryllium oxide may be removed by dissolving with an acid. For titanium, aluminum oxide works very satisfactorily. Aluminum oxide, which is often used as a catalyst carrier, is available in spherical form of various sizes. After the casting of the titanium around the aluminum oxide, the aluminum oxide may be leached or dissolved by use of hot caustic.

Metals, such as magnesium and aluminum, and the alloys of these metals with minor proportions of metals, such as lithium and silicon, have relatively low melting points and thus may be more easily cast or molded to form the desired element than high melting point metals such as titanium and beryllium. However, fuel elements containing titanium and beryllium may be obtained without employing the high temperatures necessary to melt these metals. Fine solid particles of these high melting point metals may be dispersed in minor proportions in a molten low melting point metal and the dispersion cast into the fuel element. A mixture of molten magnesium or aluminum with fine particles of beryllium or titanium may thus be obtained and the fuel element of the mixture cast using temperatures normally employed in casting of the low melting point metals. Due to the cellular structure and the presence of the insoluble constituent in the mold, the finely dispersed metal does not settle rapidly but remains relatively uniformly dispersed throughout the element until it solidifies.

It is essential that the voids in the cellular metal fuel element be interconnecting and be of relatively uniform size in order to obtain a solid propellant which has uniform burning characteristics. To obtain the voids uniform in size and interconnecting, the granules of the metal insoluble constituent used in packing the mold must be of a relatively uniform size and spherical in shape. Thus when the mold is packed, the granules are systematically in contact with each other. Upon contacting the casting with a solvent, sufficient area of the granules is exposed to the solvent to dissolve it from the metal leaving interconnecting openings of relatively uniform size. If irregular granules or particles of the metal insoluble constituent are used, some of the particles may become totally or almost totally encased by the metal and are not removed by the solvent. Thus a portion of the metal is not subjected to oxidation due to absence of the oxidant.

The term "spherical," as used herein in reference to the voids in the fuel element and the granules used in packing of the mold, includes voids or the granules which are substantially spherical as well as those having the shape of a perfect sphere.

Although the particular size of the voids employed in an element will vary with the metal used and the oxidant with which it is intended to fill the voids, generally more uniform oxidation is obtained with smaller voids or openings. Thus the size of the granules or particles usually used are such that they will pass through a No. 2½ mesh screen and be retained on a 120 mesh screen, U.S. Sieve Series, preferably in the range of 20 to 40 mesh. Larger voids may be used on relatively large elements, but generally the cross-sectional area of a void seldom exceeds $1/64$ of the cross-sectional area of the element.

A metal cellular element containing as little as 26 percent metal and the remainder voids may be readily obtained by using spherical particles. The ratio of the metal to voids in the element may be controlled by the size of granules used in packing the mold. Most often the granules used are approximately of the same size, but if a high percentage of voids is desirable, different size granules may be intermixed. Also the voids may be increased by dissolving away parts of the surface of the metal with a buffer solution, enlarging the openings. The voids in the metal may also be increased by pressing the salts to decrease the interstitial volume for filling with the metal. Elements having from 60 to 74 percent of their volume in voids or openings are most often used.

Numerous methods may be used in filling the voids with an oxidant or an oxidant and a fuel-containing material. Where the oxidant or a material containing an oxidant and a fuel are solids at room temperatures and may be heated to their melting point safely, the material may be heated to its molten state and the cellular element immersed in the molten material. This may be done under evacuated conditions to assure that no air is entrapped in the voids of the metal element. It is also possible to fill the voids conveniently by having the oxidant or the fuel and oxidant mixture when in solid form reduced to a very fine powder and the fine powder poured into the voids. Vibration of the element while the powder is added greatly aids in filling the voids. However, it is generally difficult to uniformly fill or pack all of the openings or voids in the element. The above methods are very well adaptable to solid oxidizers, such as ammonium nitrate, ammonium perchlorate, magnesium perchlorate, eutectics of mixtures of perchlorates of aluminum, magnesium, lithium, sodium, calcium and ammonium.

It is not necessary to use an oxidizer which is a solid. A liquid oxidant may be used with a gelling agent. The liquid oxidant may be intermixed with the gelling agent and then used to impregnate the metal fuel element. The element is subjected to the mixture of liquid oxidant and gelling agent until the oxidant becomes gelled.

Generally the oxidant employed in filling the voids of the metal fuel element is stable at room temperatures and will not react with the metal fuel element until ignited or heated to an elevated temperature. Oxidants which are normally reactive with the fuel element at relatively low temperatures, such as molten ammonium nitrate with magnesium, however, may be used after the fuel element has been treated with a protective film. The metal fuel elements may be coated with a lacquer, such as cellulose nitrate or cellulose acetate lacquer, to keep the oxidant from coming into contact with the metal. Upon heating or burning of the propellant, the film becomes oxidized exposing the metal to the oxidant.

Numerous methods may be used for igniting the solid propellant. A very convenient method is to embed an electrical wire into the propellant near the surface. The electrical wire may be heated to a temperature sufficient to ignite the propellant by passage of an electric current through the wire. In addition to using a heated wire, the propellant may be equipped with a separate fuse which can be inserted into the propellant when it is desirable to ignite it. Another method is to drill a hole in the solid propellant and pack the opening with a readily ignitable material, such as a mixture of powdered aluminum and ammonium perchlorate and ignite this mixture by means of a heated wire. In this way the fuse is made as an integral part of the propellant.

To further illustrate the invention, a mold for casting a piece 3 inches in diameter and 8 inches long was used in the formation of a magnesium cellular fuel element. The mold was packed with spherical granules of sodium chloride which passed through a No. 6 mesh screen but were retained on a No. 8 mesh screen, U.S. Sieve Series. These granules of sodium chloride were obtained by prilling.

After packing the mold with the sodium chloride granules, it was preheated to a temperature of approximately 1100° F. A molten magnesium alloy containing 0.18 weight percent of manganese, 6.0 weight percent of aluminum, 3 weight percent of zinc, and the remainder magnesium was heated to a temperature of 1300° F. to melt the alloy and then poured into the mold. The mold was allowed to cool to room temperature and the 3 inch in diameter by 8 inch long sodium chloride-magnesium alloy casting was removed from the mold. The casting was placed in a stream of tap water to dissolve the sodium chloride from the casting. After the sodium chloride had been dissolved, the cellular fuel element was immersed in dilute nitric acid containing about 2 to 3 weight percent of acid until the metal developed a bright shine to its surface. Approximately $1/3$ of the volume of the element was magnesium and $2/3$ of the volume voids.

Two sections, 1½ inches long, were cut off from the end of the cylindrical element, dried, and filled with an oxidant. The 1½ inch sections were wrapped with aluminum foil and finely divided ammonium perchlorate was poured into voids of one of the 1½ inch sections. Similarly the other was filled with ammonium nitrate. The sections were vibrated to aid in filling the voids.

To ignite the sections containing the pulverized oxidants, a hole approximately ½ inch in diameter and ½ inch deep was drilled at the center of the pieces and packed with a mixture of powdered aluminum and ammonium perchlorate. The mixture was bound together with a cellulose acetate cement. A current passed through a wire embedded in the aluminum and ammonium perchlorate mixture by use of a 24 volt battery igniting the mixture which in turn ignited the solid propellant. The propellants once ignited burned rapidly at a uniform rate leaving a white ash.

In another run an aluminum cellular fuel element was immersed in molten ammonium nitrate to fill the voids. Ammonium nitrate was heated in a 4 liter beaker and after the nitrate became molten, the cellular element was immersed in it. Approximately 90 percent of the voids were filled with the ammonium nitrate by this method.

Cellular elements of aluminum-magnesium alloys and aluminum-silicon alloys containing from 4 to 7 weight percent of silicon were cast in a manner similar to that described above using sodium chloride as the metal insoluble constituent. Other metals and alloys may be similarly cast and used as a cellular fuel element in solid propellants.

What is claimed is:

1. A solid propellant consisting essentially of a cellular structure of a material of the group consisting of aluminum, magnesium, beryllium, alloys and mixtures thereof and alloys and mixtures thereof with silicon, lithium, and titanium in minor proportions, said structure having substantially spherical, interconnecting cells, said cells being filled with an oxidant in solid form in an amount to substantially completely oxidize the cellular structure.

2. A solid propellant according to claim 1 wherein each of said voids in the cellular fuel has a cross-sectional area less than $1/64$ of the cross-sectional area of the element.

3. A solid propellant according to claim 2 wherein the cellular element is magnesium.

4. A solid propellant according to claim 2 wherein the cellular element is aluminum.

5. A solid propellant which consists essentially of a cellular fuel element of magnesium having at least 60 percent of its volume as interconnecting spherical cells obtained by dissolving out substantially spherical granules around which the magnesium had been poured, each of said cells having a cross-sectional area less than 1/64 of the cross-sectional area of the element and a solid oxidant of said metal filling said cells.

6. A solid propellant of claim 5 wherein the solid oxidant is ammonium nitrate.

7. A solid propellant of claim 5 wherein the solid oxidant is ammonium nitrate.

8. A process for the preparation of a solid propellant containing a cellular metal fuel element having substantially uniform cells, which comprises packing a mold with spherical granules of predetermined sizes of a metal insoluble constituent whereby interconnecting openings between the granules are present, pouring a molten metal selected from the group consisting of magnesium, aluminum, beryllium alloys and mixtures thereof and alloys and mixtures thereof with lithium, silicon, and titanium into the mold whereby the molten metal flows around the granules and into the open spaces between the granules in the mold, said granules of metal insoluble constituent having a melting point above the temperature of the molten metal, cooling the molten metal to solidify the metal, contacting said solidified metal and the metal insoluble constituent encased by said metal with a solvent for the metal insoluble constituent inert to the metal to thereby dissolve the metal insoluble constituent from the solidified metal to give a metallic cellular fuel element having interconnecting cells, and filling the cells with an oxidant, in a solid form for said metal in an amount to substantially completely oxidize the metallic cellular element.

9. A process for the preparation of a solid propellant containing a cellular metal fuel element having substantially uniform spherical cells, which comprises packing a mold with spherical granules of predetermined sizes of a salt having a melting point above the melting point of magnesium and insoluble in molten magnesium, pouring molten magnesium into the mold whereby the molten magnesium flows around the granules to fill the spaces between the granules, cooling the mold to solidify the metal, dissolving the granules of salt from the metal to give a magnesium cellular fuel element having interconnecting cells, filling the cells with an oxidant, in a solid form for said metal in an amount to substantially completely oxidize the magnesium in the fuel element.

10. A process for the preparation of a solid propellant, which comprises packing a mold with spherical granules of sodium chloride of substantially uniform size in the range of granules passing through a 20 mesh screen and being retained on a 40 mesh screen, U.S. Sieve Series, pouring molten magnesium into the mold whereby the molten magnesium flows around the sodium chloride granules and fills the spaces between the granules, cooling the mold to solidify the magnesium into a casting, removing the casting from the mold, passing water over the casting to dissolve the sodium chloride from the casting to give a magnesium cellular fuel element having interconnecting cells, drying the cellular fuel element, and filling the cells with ammonium nitrate in an amount to substantially completely oxidize the magnesium in the fuel element.

References Cited by the Examiner

UNITED STATES PATENTS

| | | |
|---|---|---|
| 1,506,323 | 8/24 | O'Neill. |
| 1,530,692 | 3/25 | Paulus. |
| 2,530,493 | 11/50 | Van Loenen. |
| 2,802,332 | 8/57 | Orsino _____ 60—35.6 |

OTHER REFERENCES

"Jet Propulsion," Air Technical Service Command, 1946, p. 272.

Anderton: Aviation Week, Nov. 12, 1956, pp. 51, 53, 55, 57.

Gordon: Jet Propulsion, vol. 28, No. 11, November 1958, pp. 769–70.

Babcock et al.: Engineering and Mining Journal, vol. 155, No. 3, pp. 84–6.

CARL D. QUARFORTH, *Primary Examiner.*

ROGER L. CAMPBELL, LEON D. ROSDOL, *Examiners.*